(12) United States Patent
Yao et al.

(10) Patent No.: US 11,066,920 B2
(45) Date of Patent: Jul. 20, 2021

(54) GUIDED WAVE ATTENUATION WELL LOGGING EXCITATION OPTIMIZER BASED ON WAVEFORM MODELING

(71) Applicant: Baker Hughes, a GE company, LLC, Houston, TX (US)

(72) Inventors: Xiaochu Yao, Conroe, TX (US); Pawel J. Matuszyk, Spring, TX (US); Douglas J. Patterson, Magnolia, TX (US); Rajdeep Das, Houston, TX (US)

(73) Assignee: BAKER HUGHES HOLDINGS LLC, Houston, TX (US)

( * ) Notice: Subject to any disclaimer, the term of this patent is extended or adjusted under 35 U.S.C. 154(b) by 522 days.

(21) Appl. No.: 15/809,779

(22) Filed: Nov. 10, 2017

(65) Prior Publication Data
US 2019/0145241 A1   May 16, 2019

(51) Int. Cl.
*E21B 47/002* (2012.01)
*E21B 47/12* (2012.01)
(Continued)

(52) U.S. Cl.
CPC ............ *E21B 47/002* (2020.05); *E21B 41/02* (2013.01); *E21B 47/005* (2020.05); *E21B 47/12* (2013.01); *G01N 21/954* (2013.01)

(58) Field of Classification Search
CPC .. E21B 47/0002; E21B 47/0005; E21B 47/12; E21B 41/02; E21B 47/0025; G01N 21/954
See application file for complete search history.

(56) References Cited

U.S. PATENT DOCUMENTS

| 7,660,197 | B2 | 2/2010 | Barolak |
| RE43,960 | E | 2/2013 | Barolak |

(Continued)

OTHER PUBLICATIONS

Liu et al. "Acoustic Guided Waves in Cylindrical Solid-Fluid Structures: Modeling with a Sweeping Frequency Finite Element . . . " Published Feb. 2017, AIP Conf. Proceed. 1806, 030004 [retrieved on Feb. 9, 2020], Retrieved from <https://aip.scitation.org/doi/abs/10.1063/1.4974572> (Year: 2017).*

(Continued)

*Primary Examiner* — Rehana Perveen
*Assistant Examiner* — Alfred H B Wechselberger
(74) *Attorney, Agent, or Firm* — Mossman Kumar & Tyler PC

(57) ABSTRACT

Methods and apparatus for inspecting oilfield infrastructure components. Methods include estimating an optimal value for at least one excitation parameter for an acoustic excitation source to produce a guided wave of mixed multiple modes in the component; selecting at least one excitation parameter corresponding to an optimal simulated guided wave determined in dependence upon the application of waveform criteria to the time domain waveforms; and generating a guided wave in the tubular using the at least one optimal excitation parameter. Methods may include calculating a guided wave dispersion relation; modeling each of the plurality of simulated guided waves, wherein the modeling comprises generating a time domain waveform for each of a plurality of wave modes in dependence upon the acoustic excitation source; selecting the at least one excitation parameter corresponding to an optimal simulated guided wave determined in dependence upon the application of waveform criteria to the time domain waveforms.

16 Claims, 12 Drawing Sheets

(51) Int. Cl.
  *E21B 41/02* (2006.01)
  *E21B 47/005* (2012.01)
  *G01N 21/954* (2006.01)

(56) References Cited

U.S. PATENT DOCUMENTS

| | | | |
|---|---|---|---|
| 10,436,018 B2 | 10/2019 | Kouchmeshky et al. | |
| 2009/0003133 A1* | 1/2009 | Dalton | E21B 47/16 367/82 |
| 2010/0263449 A1* | 10/2010 | Bolshakov | G01N 29/348 73/597 |
| 2010/0305870 A1* | 12/2010 | Camilli | G01N 29/032 702/24 |
| 2012/0069705 A1* | 3/2012 | Zhao | E21B 47/005 367/35 |
| 2014/0160889 A1* | 6/2014 | Barolak | G01N 29/225 367/35 |
| 2015/0135836 A1* | 5/2015 | Rose | G01N 29/04 73/597 |
| 2015/0177404 A1 | 6/2015 | Pabon et al. | |
| 2015/0268367 A1* | 9/2015 | Khajeh | G01V 1/46 367/35 |
| 2015/0338378 A1 | 11/2015 | Lu et al. | |
| 2016/0160629 A1 | 6/2016 | Donderici et al. | |
| 2017/0138525 A1 | 5/2017 | Hartog et al. | |
| 2018/0003680 A1* | 1/2018 | Kannajosyula | G01N 29/2412 |
| 2019/0242851 A1* | 8/2019 | Sinha | G01H 11/06 |

OTHER PUBLICATIONS

Patterson et al. "Extending the Understanding of In-situ Cement Properties" SPWLA 57th Annual Logging Symposium, Jun. 2016. (Year: 2016).*

Patterson et al. "Utilization of Electromagnetic Acoustic Transducers in Downhole Cement Evaluation" SPWLA 56th Annual Logging Symposium, Jun. 2015. (Year: 2015).*

Burns, D. "Formation Property Estimation from Guided Waves in a Borehole" [Thesis] MIT, Department of Earth, Atmospheric, and Planetary Sciences, pp. 59-60 and 98 [retrieved on Feb. 12, 2020]. Retrieved from <https://dspace.mit.edu/handle/1721.1/51456> (Year: 1986).*

Andruschak, N. "Guided Wave Inspection of Supported Pipe Locations Using Electromagnetic Acoustic Transducers" [Thesis] Mechanical and Industrial Engineering, University of Toronto [retrieved on Oct. 22, 2020]. (Year: 2014).*

Patterson, D., et al., "Utilization of Electromagnetic Acoustic Transducers in Downhole Cement Evaluation", SPWLA 56th Annual Logging Symposium, Society of Petrophysicists and Well-Log Analysts, Jul. 2015, 1-16.

Patterson, D., et al., "Extending the Understanding of In-situ Cement Properties", SPWLA 57th Annual Logging Symposium, Society of Petrophysicists and Well-Log Analysts, Jun. 2016, 1-21.

Bartoli, I, et al., "Modeling Wave Propagation in Damped Waveguides of Arbitrary Cross-section", Journal of Sound and Vibration, 295 (3), Mar. 2006, 685-707.

Gao, H., "Ultrasonic Guided Wave Mechanics for Composite Material Structural Health Monitoring", Ph.D. thesis, The Pennsylvania State University, May 2007, 1-215.

Van Velsor, J. K., "Circumferential Guided Waves in Elastic and Viscoelastic Multilayered Annuli", Ph.D. thesis, The Pennsylvania State University Aug. 2009, 1-203.

Treyssede, F. et al., "Finite Element Computation of Trapped and Leaky Elastic Waves in Open Stratifed Waveguides", Wave Motion, 51 (7), May 2014, 1093-1107.

Nguyen, K.L., et al., "Numerical Modeling of Three-dimensional Open Elastic Waveguides Combining Semi-analytical Finite Element and Perfectly Matched Layer Methods", Journal of Sound and Vibration 344,Dec. 2014, 158-178.

Matuszyk, P.J., "Modeling of Guided Circumferential SH and Lamb-type Waves in Open Waveguides with Semi-Analytical Finite Element and Perfectly Matched Layer Method", Journal of Sound and Vibration, 386, Sep. 2016, 295-310.

Loveday, P.W., "Simulation of Piezoelectric Excitation of Guided Waves Using Waveguide Finite Elements", IEEE Transactions on Ultrasonics, Ferroelectrics, and Frequency Control 55 (9), Sep. 2008, 2038-2045.

Damljanovic, V., et al., "Forced Response of a Cylindrical Waveguide with Simulation of the Wavenumber Extraction Problem", The Journal of the Acoustical Society of America, 115 (4), Jan. 2004, 1582-1591.

Hayashi, T., et al., Guided Wave Dispersion Curves for a Bar with an Arbitrary Cross-section, a Rod and Rail Example, Ultrasonics, 41 (3), Feb. 2003, 175-183.

* cited by examiner

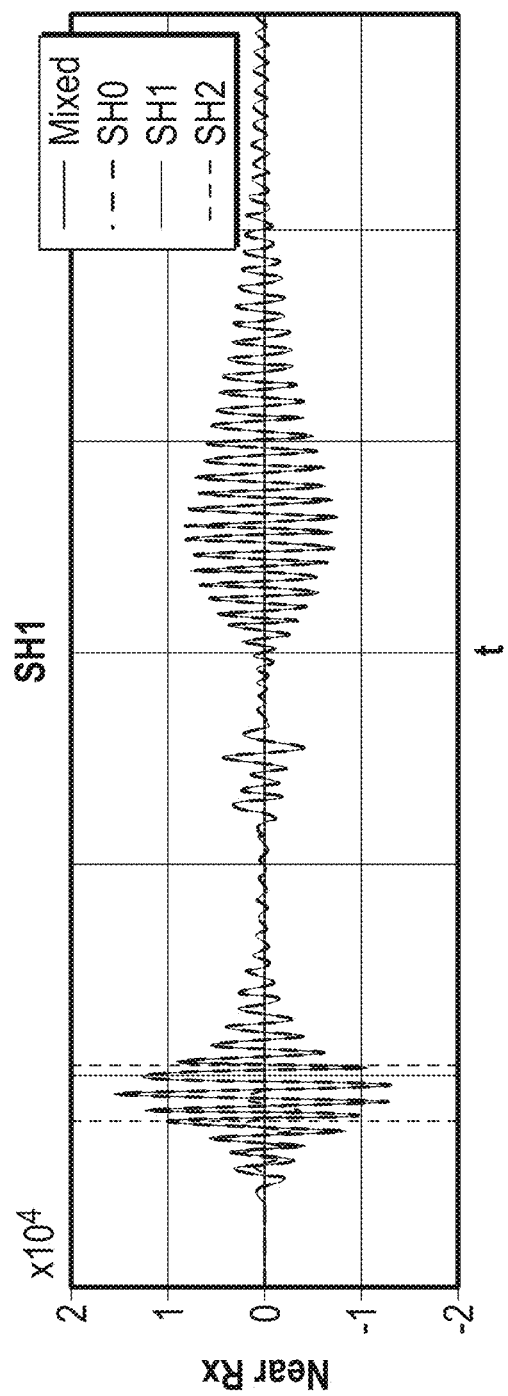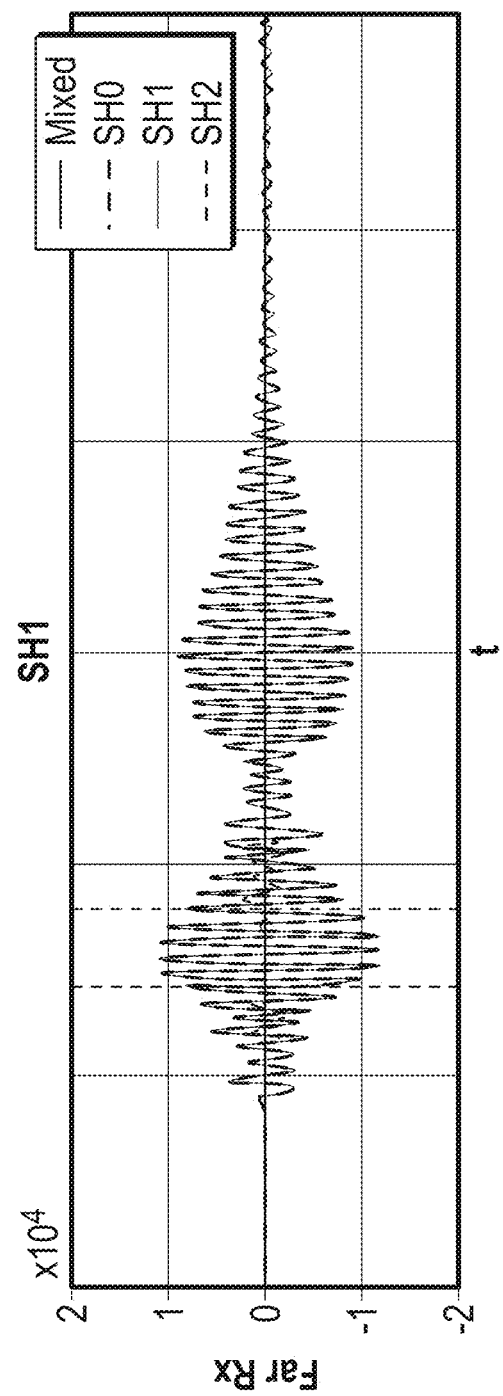
FIG. 4

GUIDED WAVE ATTENUATION WELL LOGGING EXCITATION OPTIMIZER BASED ON WAVEFORM MODELING

FIELD OF THE DISCLOSURE

This disclosure generally relates to borehole tools, and in particular to methods and apparatuses for conducting well logging.

BACKGROUND OF THE DISCLOSURE

Drilling wells for various purposes is well-known. Such wells may be drilled for geothermal purposes, to produce hydrocarbons (e.g., oil and gas), to produce water, and so on. Well depth may range from a few thousand feet to 25,000 feet or more. In hydrocarbon wells, downhole tools often incorporate various sensors, instruments and control devices in order to carry out any number of downhole operations. Thus, the tools may include sensors and/or electronics for formation evaluation, monitoring and controlling the tool itself, and so on.

Development of the formation to extract hydrocarbons may include installation of steel pipe, known as casing, within a borehole, including the application of cement in the annulus between borehole and casing. It is known to conduct acoustic inspection of a casing cemented in a borehole to determine specific properties related to the casing and surrounding materials. For example, the bond between the cement and the casing may be evaluated, or the strength of the cement behind the casing or the casing thickness may be estimated, using measurements of reflected acoustic waves. This may be generally referred to as casing cement bond logging, which may be accomplished using a casing cement bond logging tool conveyed through the formation along the interior of the casing while taking measurements. In other examples of cement bond logging, a circumferential guided wave may be used to evaluate casing-related properties. For example, Lamb and shear wave attenuation measurements may be used to determine cement properties.

SUMMARY OF THE DISCLOSURE

In aspects, the present disclosure is related to methods and apparatuses for inspecting oilfield infrastructure components. In general embodiments, oilfield infrastructure may include downhole tubular. Some aspects may be directed to well logging using a logging tool in a borehole in an earth formation. Methods of the present disclosure may include estimating an optimal value for at least one excitation parameter for an acoustic excitation source to produce a guided wave of mixed multiple modes in the component, the at least one excitation parameter comprising at least frequency; selecting the at least one excitation parameter corresponding to an optimal simulated guided wave determined in dependence upon the application of waveform criteria to the time domain waveforms; and generating a guided wave in the tubular using the at least one optimal excitation parameter. Methods may include measuring at least one wave property of the guided wave in the tubular with the logging tool; and estimating a property relating to the component, such as, for example, a property relating to installation of casing, using the at least one wave property.

The property may comprise a characteristic of a structural feature relating to the at least one tubular. The structural feature may comprise at least one of: i) tubular ovality of the at least one tubular; ii) deformation of the at least one tubular; iii) corrosion of the at least one tubular, iv) perforation of the at least one tubular, v) a presence of a completion component outside of the at least one tubular, vi) eccentricity of the at least one tubular with respect to another component, vii) a material property of the at least one tubular; viii) a material property of a material surrounding the at least one tubular.

The property may include at least one of: i) a shear modulus of the cement; ii) a Young's modulus of the cement; iii) cement density; iv) compressive stress; v) casing thickness. Methods may include conducting further operations in the formation in dependence upon the property. The further operations may include at least one of: i) geosteering; ii) drilling additional boreholes in the formation; iii) performing additional measurements on the formation; iv) estimating additional parameters of the formation; v) installing equipment in the borehole; vi) evaluating the formation; vii) optimizing present or future development in the formation or in a similar formation; viii) optimizing present or future exploration in the formation or in a similar formation; ix) installing equipment in the borehole; and x) producing one or more hydrocarbons from the formation.

Estimating the optimal value for the at least one excitation parameter may include calculating a guided wave dispersion relation in a frequency domain for each of a plurality of simulated guided waves corresponding to a plurality of frequency values; modeling each of the plurality of simulated guided waves, wherein the modeling comprises generating a time domain waveform for each of a plurality of wave modes in dependence upon the acoustic excitation source; and selecting the at least one excitation parameter corresponding to an optimal simulated guided wave determined in dependence upon the application of waveform criteria to the time domain waveforms.

Methods may include modeling an attenuation-velocity response for each of the plurality of simulated guided waves. Methods may include summing the estimated time domain waveforms to model each guided wave. Methods may include estimating a processing window for calculating acoustic wave information from characteristics of a time domain waveform for at least one of the plurality of wave modes.

Methods may include generating at least one first excitation parameter for free casing, at least one second excitation parameter for fully cemented casing, and at least one third excitation parameter for partially cemented casing. The at least one excitation parameter may comprise at least one of: i) frequency; ii) number of firing cycles; iii) pulse shape; iv) firing length; v) number of unique frequencies; vi) amplitude.

Methods as described above implicitly utilize at least one processor. Some embodiments include a non-transitory computer-readable medium product accessible to the processor and having instructions thereon that, when executed, causes the at least one processor to perform methods described above. Apparatus embodiments may include, in addition to specialized borehole measurement equipment and conveyance apparatus, at least one processor and a computer memory accessible to the at least one processor comprising a computer-readable medium having instructions thereon that, when executed, causes the at least one processor to perform methods described above.

Examples of some features of the disclosure may be summarized rather broadly herein in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein:

FIGS. 3-5 illustrate corresponding free casing waveforms for SH0, SH1, and SH2, respectively.

DETAILED DESCRIPTION

Figure 1A:
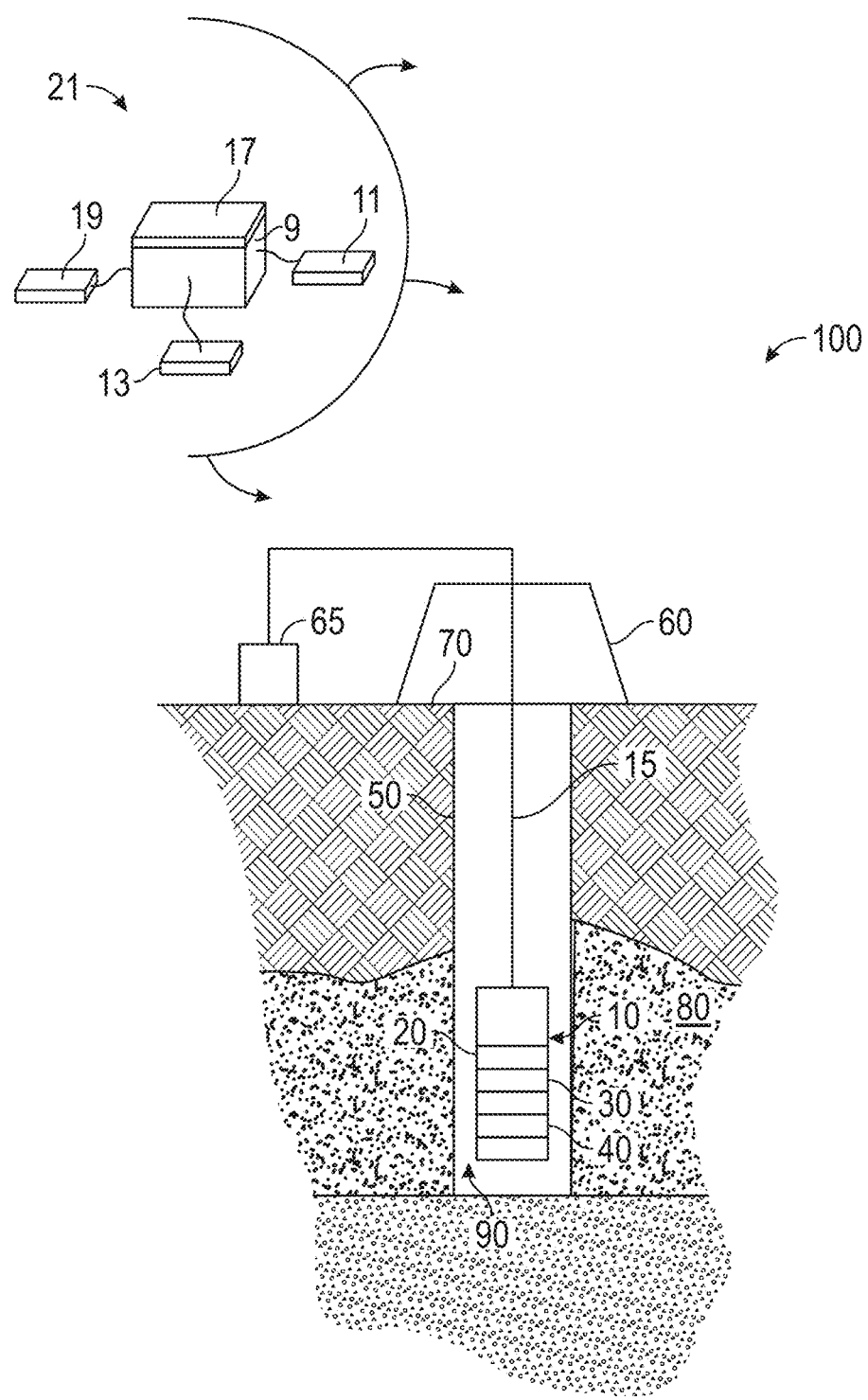
FIG. 1A schematically illustrates an acoustic wellbore logging system having a downhole tool configured to acquire acoustic measurement information.

Aspects of the present disclosure relate to apparatus and methods for well logging, including measurement and interpretation of physical phenomena indicative of parameters of interest of infrastructure installed in the formation (e.g., casing). Embodiments described herein are particularly suited to cement bond logging inspection.

Historically, EM corrosion-monitoring tools have relied upon the physical phenomena of flux leakage and/or electromagnetic induction. A flux leakage tool may magnetize the pipe to be inspected until substantially saturated. Near a point of defect (e.g., a pit, hole, or corroded area) on either the interior or exterior of the tubular, a portion of the magnetic flux leaks out of the tubular and is detected by coils on the tool's sensors. Since the magnet must be as close as possible to the tubular, tubing must be removed in order to inspect overlying casing. Further, detection of slowly varying corrosion with a flux leakage tool may be problematic.

The generation of acoustic signals and detection of reflections of these signals is well known, and these reflections may be conventionally processed to estimate cement thickness, cement bond quality, and so on. Cement evaluation may be carried out based on the use of detected signal amplitude decay to assess casing thickness, cement density, and bond integrity. Evaluation of other tubulars, both downhole and above ground, is known in the art.

Electromagnetic-acoustic transducers (EMATs) have been used in non-destructive testing, including in the borehole, using well-understood physical phenomena. In one type of EMAT, when a wire is placed near the surface of an electrically conducting object and is driven by a current at a suitable ultrasonic frequency, eddy currents are induced in a near surface region of the object. If a static magnetic field is also present, these eddy currents experience Lorentz forces. These forces cause an acoustic excitation in the object. In a reciprocal use, an electric signal will be generated in the wire as a result of acoustic excitation in a metal placed close to a permanent magnet. Attenuation and/or reflection of the acoustic waves bear information on the defects and surroundings of the object. See, for example, U.S. patent application Ser. No. 15/288,092 to Kouchmeshky et al, which is commonly owned and incorporated by reference herein in its entirety.

Guided wave attenuation cement bond logging ('CBL') measures wave attenuation along a casing circumferential direction. Multiple transmitters and receivers may be placed inside the casing for compensated attenuation measurements. See, for example, U.S. Pat. No. 7,660,197 to Barolak et al. and U.S. Pat. No. RE43,960 to Barolak et al, incorporated by reference herein in their entirety. The mechanical properties (e.g., Young's modulus, shear modulus) of the cement layer behind the casing determine the attenuation of the waves. An EMAT may be designed to produce a single waveform, such as shear horizontal waves (SH) or Lamb waves.

Due to the multi-mode nature of guided waves, different modes have different wave velocities, attenuations, and amplitudes. If multiple modes are mixed together, the attenuation measurements may have very large errors. Usually, the attenuation response of a guided wave is derived from dispersion relations using a single frequency. However, this approach doesn't take the source excitation effect into account. The frequency-domain attenuation may be very different from the attenuation measurements of waveforms in the time domain.

Due to the multi-mode nature of guided waves, it is highly beneficial to optimize the excitation for a target well. Aspects of the disclosure may include estimating an optimal value for at least one excitation parameter for an acoustic excitation source to produce a guided wave of mixed multiple modes in the tubular.

Aspects of the present disclosure include calculating a CGW dispersion relation in the frequency domain by using known techniques such as the Semi Analytical Finite Element and Perfectly Matched Layer (SAFE-PML). SAFE-PML is highly efficient, computationally. Time domain waveform reconstruction may then be achieved while taking into account the effect of the excitation source. An excitation optimizer is introduced herein which may automatically sweep through all the possible firing parameters, find the optimal choices, reconstruct their waveforms, and estimate response information (e.g., attenuation response curves). Guided wave attenuation responses determined directly from modeling waveforms with the influence of the excitation source are much accurate than those from dispersion relations.

Techniques in accordance with the present disclosure calculate circumferential guided wave ('CGW') dispersion relations in the frequency domain. Techniques may include reconstructing downhole time-domain raw waveforms by taking into account the transducer excitation effect.

Based on the waveform modeling, an excitation optimizer is configured. For example, processing windows may be automatically determined from the waveforms. Important information is extracted from the modeling waveforms for free and fully cemented casing, as well as for casing having various degrees of cementation between these extremes. Several criterion may be taken into account to select the at least one excitation parameter. Methods may include determining an optimal simulated guided wave in in dependence upon the application of waveform criteria to the time domain waveforms, and selecting the at least one excitation parameter corresponding to the optimal simulated guided wave. The selected optimal excitation parameters may be implemented and plotted out, and corresponding predicted response information calculated and presented.

Aspects of the present disclosure include systems, devices, products, and methods of well logging using a logging tool in a borehole in an earth formation. Methods may include conveying the logging tool in the borehole on a carrier; taking acoustic well logging measurements with the logging tool, and estimating a property of a volume of interest of the formation. The volume may include at least one tubular, and the property may include the relation of multiple tubulars to one another, the relation of a tubular (e.g., casing) to another component, properties of bonding materials, adhesives, treatments, fluids, and the formation surrounding the casing, and so on. Aspects of the disclosure may be useful for the excitation of guided wave modes in tubular as part of any technique.

Aspects of the present disclosure include systems and methods for formation evaluation, such as performing well logging in a borehole intersecting an earth formation, as well as casing integrity inspection. Drilling systems in accordance with aspects of the present disclosure may have an acoustic "logging-while-drilling" ('LWD') or "measurement-while-drilling" ('MWD') system as part of a bottom-hole assembly. In other aspects production tubing downhole or above ground may be inspected and evaluated for corrosion, damage, eccentricity, ovality, or other abnormalities.

Aspects of the present disclosure relate to using at least one acoustic sensor as part of one or more downhole acoustic well logging tools or distributed sensor systems to produce acoustic information responsive to an acoustic wave from the earth formation. The sensor may include at least one acoustic transmitter configured and at least one acoustic receiver disposed on a carrier in the borehole, and configured to implement techniques of the present disclosure, as described in further detail below. A receiver and transmitter may be implemented as the same transducer, different transducers, or one or more transducer arrays. Transducers may be selected from the group consisting of: (i) electro-magnetic acoustic transducers ('EMATs'), (ii) piezoelectric transducers, and (iii) wedge transducers. The information is indicative of a parameter of interest. The term "information" as used herein includes any form of information (analog, digital, EM, printed, etc.), and may include one or more of: raw data, processed data, and signals.

FIG. 1A schematically illustrates an acoustic wellbore logging system 100 having a downhole tool 10 configured to acquire acoustic measurement information. This measurement information may be used for producing an acoustic image of a borehole 50 in an earth formation 80 or another parameter of interest of a formation 80 using a sensor 40 comprising at least one acoustic transducer. Sensor 40 may include a plurality of transducers in an azimuthal array about the circumference of the tool, a transducer that rotates through a plurality of azimuthal orientations via the rotation of the drill string or of an independent platform attached to the carrier, a transducer capable of sending acoustic pulses to and receiving signals from a plurality of azimuthal orientations via the use of beam-forming, and so on as will occur to those of skill in the art. Additional sensors 45 may be used to take electromagnetic measurements in the borehole. The acoustic sensor may be configured for transmission and reception of acoustic signals. The sensor may comprise an acoustic transmitter-receiver, or transceiver (e.g., transducer). In one embodiment, electronics 30 associated with sensors 40 may be configured to record and/or process the information obtained.

The system 100 may include a conventional derrick 60 erected on a derrick floor 70. A conveyance device (carrier 15) which may be rigid or non-rigid, may be configured to convey the downhole tool 10 in the wellbore 50 intersecting the earth formation 80. Drilling fluid ('mud') 90 may be present in the borehole 50. The carrier 15 may be a drill string, coiled tubing, a slickline, an e-line, a wireline, etc. Downhole tool 10 may be coupled or combined with additional tools, including, e.g., some or all the information processing system (inset). Thus, depending on the configuration, the tool 10 may be used during drilling and/or after the wellbore 50 has been formed. While a land system is shown, the teachings of the present disclosure may also be utilized in offshore or subsea applications. The carrier 15 may include embedded conductors for power and/or data for providing signal and/or power communication between the surface and downhole equipment (e.g., a seven conductor cable).

A surface control system 65 receives signals from downhole sensor 40 and other sensors used in the system 100 and processes such signals according to programmed instructions provided to the surface control system 65. The surface control system 65 may display desired parameters and other information on a display/monitor that is utilized by an operator. The surface control system 65 may further communicate with a downhole control system 20 at a suitable location on downhole tool 10. The surface control system 65 may process data relating to the operations and data from the sensor 40, and may control one or more downhole operations performed by system 100.

Figure 1B:
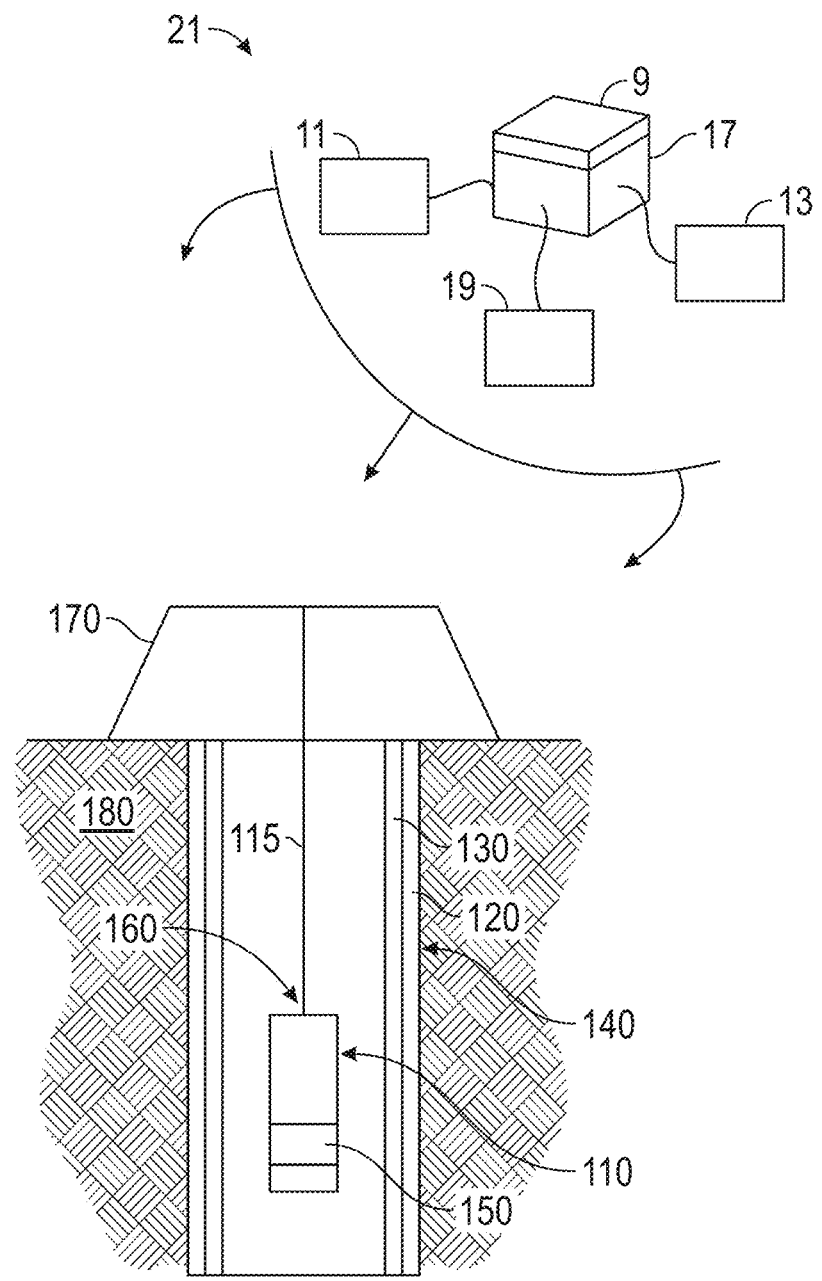
FIG. 1B illustrates an acoustic logging tool in accordance with embodiments of the present disclosure.

FIG. 1A schematically illustrates an acoustic wellbore logging system 100 having a downhole tool 10 configured to acquire acoustic measurement information. FIG. 1B illustrates an acoustic logging tool in accordance with embodiments of the present disclosure. The tool 110 is configured to be conveyed in a borehole intersecting a formation 180. The borehole wall 140 is lined with casing 130 filled with a downhole fluid 160, such as, for example, drilling fluid. Cement 120 fills the annulus between the borehole wall 140 and the casing 130. In one illustrative embodiment, the tool 110 may contain a sensor unit 150, including, for example, one or more EMATs, including a magnet array and at least one sensor coil (or other acoustic transducers), and configured for evaluation of the cement bond existing between the system of the casing 130, the borehole wall 140, and the cement 120 according to known techniques. Sensor unit 150 may include may include electronics configured to record and/or process the information obtained, or these electronics may be elsewhere on tool 110 or at the surface.

The system 101 may include a conventional derrick 170. A conveyance device (carrier 115) which may be rigid or non-rigid, may be configured to convey the downhole tool 110 into wellbore 140 in proximity to formation 180. The carrier 115 may be a drill string, coiled tubing, a slickline, an e-line, a wireline, etc. Downhole tool 110 may be coupled or combined with additional tools. Thus, depending on the configuration, the tool 110 may be used during drilling and/or after the wellbore (borehole) 140 has been formed. While a land system is shown, the teachings of the present disclosure may also be utilized in offshore or subsea applications. The carrier 115 may include embedded conductors for power and/or data for providing signal and/or power communication between the surface and downhole equipment. The carrier 115 may include a bottom hole assembly, which may include a drilling motor for rotating a drill bit.

Certain embodiments of the present disclosure may be implemented with a hardware environment 21 that includes an information processor 17, an information storage medium 13, an input device 11, processor memory 9, and may include peripheral information storage medium 19. The hardware environment may be in the well, at the rig, or at a remote location. Moreover, the several components of the hardware environment may be distributed among those locations. The input device 11 may be any data reader or user input device, such as data card reader, keyboard, USB port, etc. The information storage medium 13 stores information provided by the detectors. Information storage medium 13 may include any non-transitory computer-readable medium for standard computer information storage, such as a USB drive, memory stick, hard disk, removable RAM, EPROMs, EAROMs, flash memories and optical disks or other commonly used memory storage system known to one of ordinary skill in the art including Internet based storage. Information storage medium 13 stores a program that when executed causes information processor 17 to execute the disclosed method. Information storage medium 13 may also store the formation information provided by the user, or the formation information may be stored in a peripheral information storage medium 19, which may be any standard computer information storage device, such as a USB drive, memory stick, hard disk, removable RAM, or other commonly used memory storage system known to one of ordinary skill in the art including Internet based storage. Information processor 17 may be any form of computer or mathematical processing hardware, including Internet based hardware. When the program is loaded from information storage medium 13 into processor memory 9 (e.g. computer RAM), the program, when executed, causes information processor 17 to retrieve detector information from either information storage medium 13 or peripheral information storage medium 19 and process the information to estimate a parameter of interest. Information processor 17 may be located on the surface or downhole.

The term "information" as used herein includes any form of information (analog, digital, EM, printed, etc.). As used herein, a processor is any information processing device that transmits, receives, manipulates, converts, calculates, modulates, transposes, carries, stores, or otherwise utilizes information. In several non-limiting aspects of the disclosure, an information processing device includes a computer that executes programmed instructions for performing various methods. These instructions may provide for equipment operation, control, data collection and analysis and other functions in addition to the functions described in this disclosure. The processor may execute instructions stored in computer memory accessible to the processor, or may employ logic implemented as field-programmable gate arrays ('FPGAs'), application-specific integrated circuits ('ASICs'), other combinatorial or sequential logic hardware, and so on.

In one embodiment, electronics associated with the transducers may be configured to take measurements as the tool moves along the longitudinal axis of the borehole ('axially') using sensor 40. These measurements may be substantially continuous, which may be defined as being repeated at very small increments of depth, such that the resulting information has sufficient scope and resolution to provide an image of tubular parameters (e.g., properties of the tubular or supporting infrastructure).

In other embodiments, all or a portion of the electronics may be located elsewhere (e.g., at the surface, or remotely). To perform the treatments during a single trip, the tool may use a high bandwidth transmission to transmit the information acquired by sensors 40 and 45 to the surface for analysis. For instance, a communication line for transmitting the acquired information may be an optical fiber, a metal conductor, or any other suitable signal conducting medium. It should be appreciated that the use of a "high bandwidth" communication line may allow surface personnel to monitor and control operations in "near real-time."

One point of novelty of the systems illustrated in FIGS. 1A & 1B is that the at least one processor may be configured to perform certain methods (discussed below) that are not in the prior art. A surface control system or downhole control system may be configured to control the tool described above and any incorporated sensors and to estimate a parameter of interest according to methods described herein.

Techniques described herein are subject to application in various different embodiments. In some general embodiments, carrier 15 is implemented as a tool string of a drilling system, and the acoustic wellbore logging may be characterized as "logging-while-drilling" (LWD) or "measurement-while-drilling" (MWD) operations.

Processing Window Determination

From SAFE-PML modeling and wave reconstruction process, the time-domain waveforms for the $m^{th}$ mode $u_m(t)$ can be summed up for the generally mixed waveforms $u_{mix}(t)$. Practically, a limited number of modes may be emphasized for particular implementations. In one instance, only the first three modes are used. That is, for shear wave modes (SH), only SH0, SH1, and SH2 are considered; for lamb wave modes (LM), only A0, S0, and A1 may be calculated.

$$u_{mix}(t) = \sum_{m=1}^{3} u_m(t) \qquad (1)$$

For EMAT based tubular inspection measurements (e.g., measurements using the INTeX™, casing integrity explorer tool provided by Baker Hughes, a GE company), processing windows may be a factor in extracting a wave package for calculating acoustic wave information (e.g., attenuation calculations). Since all modes are calculated separately, windows can be simply determined from the separated waveforms. The start and end time of the processing window $win_m(t)$ is determined by window amplitude ratio $win_{ratio}$, such as 50%, 70%, and 80% for SH0/A0, SH1/S0, and SH2 respectively.

$$win_m(t) = \begin{cases} 0 & \text{if } u_m(t) \leq \max(u_m(t)) \cdot win_{ratio}, \\ 1 & \text{if } u_m(t) > \max(u_m(t)) \cdot win_{ratio}. \end{cases} \qquad (2)$$

Amplitudes of the waveforms are determined by the maximum envelope of the certain modes:

$$A_m = \max(\text{abs}(\text{hilbert}(u(t) \cdot win_m(t)))) \qquad (3).$$

Attenuation may be calculated using propagation distance (pd) as $$\text{att} = [20 \log_{10}(A_r/A_f)]/\text{pd} \qquad (4),$$

usually with units of dB/ft.

Excitation Optimizer

In embodiments, the EMAT excitation tool may have 20, 30, 60 or more different firing frequencies ranging from less than 100 kHz to 500 kHz or more. Due to the complex electrical circuit design, firing frequencies may not represent a true center frequency. Additionally, the number of firing cycles may vary, and can be selected to be from 1 to 10 cycles or more. The higher the cycle number, the narrower the excitation frequency bandwidth may be. Thus, for particular applications, there may be more than 50, 60, 75, or 100 different firing parameter combinations to choose from for each mode.

Optimization of firing parameters for each specific casing may be highly desirable. Due to the multi-mode excitation nature of guided waves, it is quantification of optimal firing parameters is non-intuitive. An excitation optimizer module may be employed to select at least one excitation parameter corresponding to an optimal simulated guided wave. This optimal simulated guided wave may be determined in dependence upon the application of waveform criteria to the time domain waveforms.

Criteria may incorporate a variety of practical considerations and knowledge of best practices in guided wave measurement and anomaly detection in downhole infrastructure. Example criteria may include:

1. Lack of EM noise contamination for first arrival waveforms.
2. Separation of the mode of interest from other modes, either in time-domain or in frequency-domain.
3. Waveform attenuation close to modeling attenuation for the selected modes.
4. Sufficient amplitude of the waveforms to meet threshold signal-to-noise ratio.
5. Attenuation response of the target volume (e.g., cemented casing) within measurement limits.

Implementing the first criteria may be carried out using a flag variable noise$_{flag}$, expressed as $$\text{noise}_{flag} = \begin{cases} 0 & \text{if } t_{wins} \le t_{noise}, \\ 1 & \text{if } t_{wins} > t_{noise}. \end{cases} \tag{5}$$

where $t_{wins}$ is the starting time of the processing windows for a certain modes, and $t_{noise}$ is the end time of the EM noise.

Selection of clean guided modes excitation may generally include a comparison of modeling mixed modes $u_{mix}(t)$ with separate modes waveform $u_m(t)$, $$u_{mix}(t) = \sum_{m=1}^{3} u_m(t). \tag{6}$$

Here, only the first three modes are considered. The processing windows determined from Eq. (2) $win_m(t)$ are applied on $u_{mix}(t)$, and $u_m(t)$ separately for the $m^{th}$ mode. The amplitude extraction method of Eq. (3) may be used to have $A_{mixn}$, $A_{mixf}$, $A_{mn}$, $A_{mf}$.

Mixed mode attenuations $att_{mix}$ and separate mode attenuations $att_m$ are respectively calculated using Eq. (4). Theoretically, if a mode is not contaminated by other modes, there should be no difference between selected mixed modes and separate modes, satisfying:

$$\delta A_n = |A_{mixn} - A_{mn}| = 0, \tag{7}$$

$$\delta A_f = |A_{mixf} - A_{mf}| = 0, \tag{8}$$

$$\delta Att = |att_{mix} - att_m| = 0. \tag{9}$$

$\delta A_n$, $\delta A_f$, and $\delta Att$ are weights that may be combined together to quantify how clean the mode could be. Another important criteria is the amplitude of the waveform, which may be quantified by weight $A_{mn}$. Since these values have different range and units, a normalization algorithm is applied using, $$stdNorm(X) = \frac{X - \text{mean}(X)}{std(X)}, \tag{10}$$

where X is an array or matrix, mean(x) calculates the mean value of X, and std(X) calculates the standard deviation of X. A sigmoid function is applied to the normalized weights in order to constrain criterion weight function values from 0 to 1.

$$\text{Sigmoid}(x) = \frac{1}{1 + e^{-x}} \tag{11}$$

$$\delta A'_n = \text{Sigmoid}(-stdNorm(\delta A_n)), \tag{12}$$

$$\delta A'_f = \text{Sigmoid}(-stdNorm(\delta A_f)), \tag{13}$$

$$\delta Att' = \text{Sigmoid}(-stdNorm(\delta Att)), \tag{14}$$

$$A'_{mn} = \text{Sigmoid}(stdNorm(A_{mn})), \tag{15}$$

The sign of each of $\delta An$, $\delta An$, and $\delta Att$ is reversed after normalization to ensure weights vary from 0 to 1 when excitation goes from bad to good. Geometric mean may be applied on the weights to arrive at a final excitation score:

$$E = \sqrt[5]{noise_{flag} \cdot \delta A'_n \cdot \delta A'_f \cdot \delta Att' \cdot A'_{m_n}}. \tag{16}$$

Although description herein references firing parameters for free casing, cemented waveforms and partially cemented waveforms of varying degrees may also be considered. Guided modes have direct decay rates. So while waveforms for a free casing may look valid, the cemented casing waveforms may be quite different. For example, excessive attenuation may result in noisy waveforms, or processing windows under free casing waveforms may not extract the desired modes. Therefore, the excitation score map $E_f$ is evaluated for free casing. Next, the similar excitation score map $E_c$ is evaluated also for targeted cemented casing, with additional inputs of the cement density $\rho_c$, cement shear velocity $V_s$ and cement compressional velocity $V_p$. The processing windows for the cemented waveforms may be those determined from the free casing waveforms. Combining excitation maps $E_f$ and $E_c$, we arrive at E.

$$E = \sqrt{E_f E_c}, \tag{17}$$

Usually, excitation score map E is a 13×5×3 matrix, containing excitation scores of all combinations of frequencies (f), number of cycles (cn), and modes. For each mode, maximum E values may indicate the best firing parameters. A plurality (e.g., three) of optimal firing parameter combinations may be generated for each mode. These values may be used as inputs for the modeling of waveforms and attenuation response curves. To avoid selecting modes with too much attenuation, the signal decay rates $Sig_{decay}$ are evaluated as, $$Sig_{decay} = 20 \log_{10} \frac{A_{free_n}}{A_{cmt_f}}, \quad (18)$$

where, $A_{free_n}$ is the near amplitude for the free waveforms, $A_{cmt_f}$ is the far amplitude for the cemented waveforms. $Sig_{decay}$ (in dB) characterizes the ratio between the maximum signal amplitude and the minimal signal amplitude.

Figure 2A:
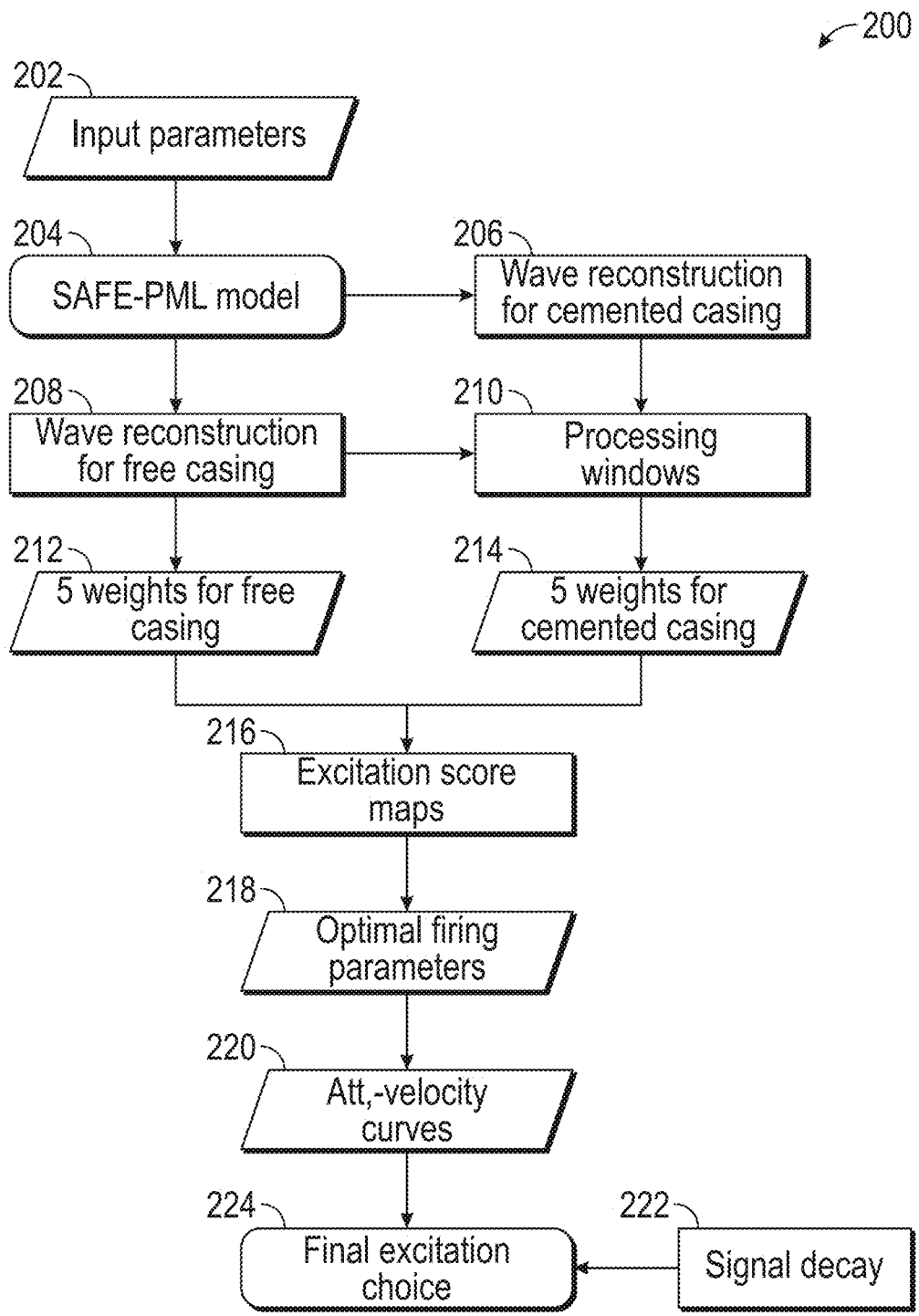
FIGS. 2A & 2B illustrate the excitation optimizer.
Figure 2B:
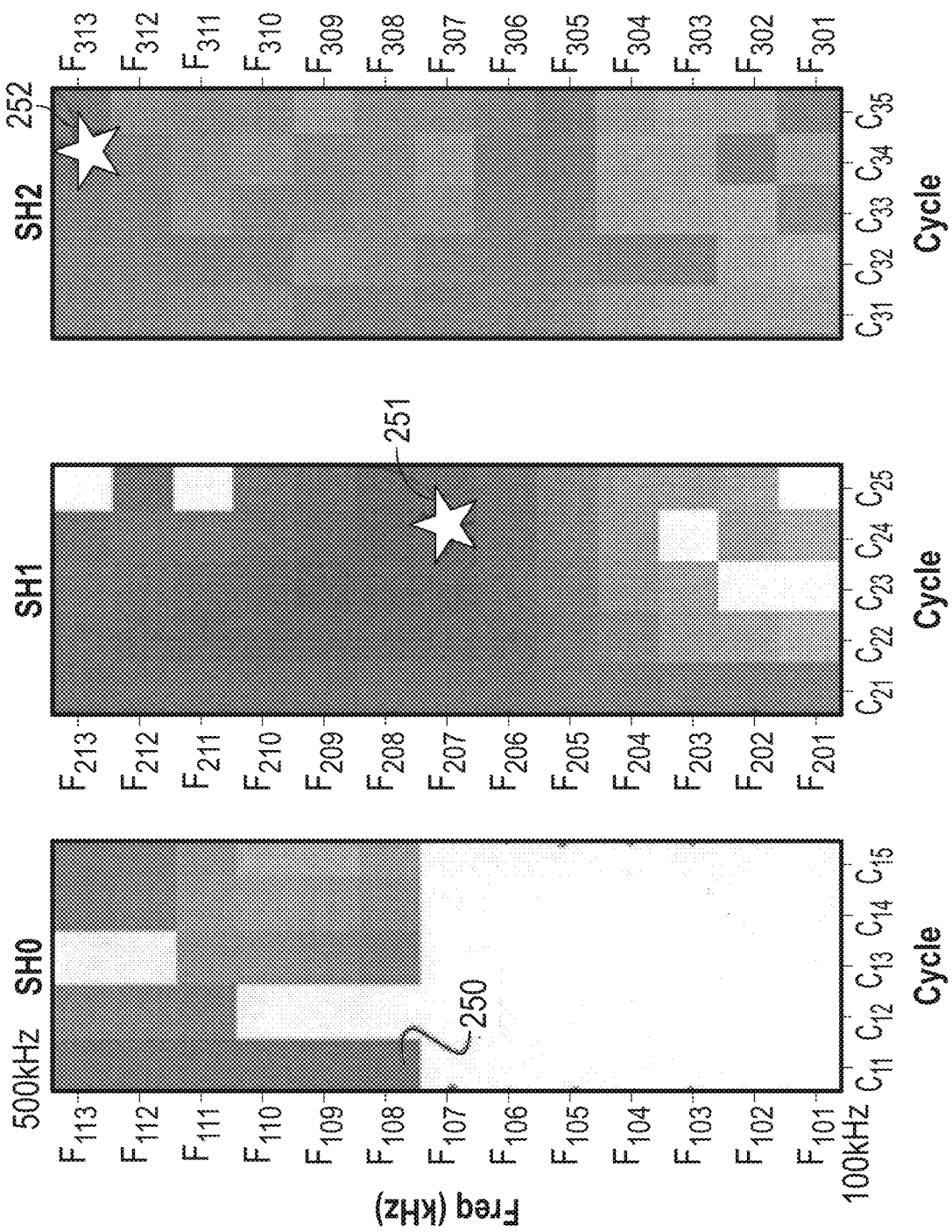

FIGS. 2A & 2B illustrate the excitation optimizer. FIG. 2A is a data flow diagram illustrating interactive modules of the optimizer in accordance with embodiments of the present disclosure. FIG. 2B shows excitation score maps for each mode. The excitation optimizer 200 may accept input parameters 202 such as mode type (e.g., SH/LM), the OD, thickness H, the cement density, and the cement shear velocity Vs, and, for LM, the cement compressional velocity Vp. The planner will then sweep through all firing parameter combinations and, for each combination, uses SAFE-PML modeling module 204 to calculate waveforms for free 208 and cemented 206 casing, respectively. The processing windows 210 are automatically determined from the modeling waveforms of the free casing 208 and are used to calculate a variety of acoustic wave information, such as amplitudes, attenuations, arrival times, wave packet characteristics, and velocity. Weights 212 and 214 are generated for free and cemented casing, respectively. Then the planner will calculate excitation scores and output excitation score maps 216 for each mode. Optimal firing parameters 218 are selected in dependence upon the results. The optimal firing parameters are used to calculate acoustic wave information, such as attenuation-velocity curves 220. Along with signal decay 222, attenuation-velocity curves 220 may be used to make the final excitation choice 224.

The score maps of FIG. 2B show a visual representation of the level of excitation for each set of parameters. The parameters depicted in FIG. 2 are frequency and cycle. Frequency may vary, for example, between 100 and 500 kHz. The instrument may be configured for use with a number of predefined frequencies ($f_{101}$ ... $f_{113}$) in combination with a cycle value ($C_{11}$ ... $C_{15}$). Not all combinations may be valid for all modes. In some instances different values may be used for each mode. These values may be unique to a particular mode, hence, predefined frequencies ($f_{201}$ ... $f_{213}$) in combination with cycle values ($C_{21}$ ... $C_{25}$) and predefined frequencies ($f_{301}$ ... $f_{313}$) in combination with cycle values ($C_{31}$ ... $C_{35}$). Darker colors indicate better excitation for each mode. Optimal parameters 250 (SH0), 251 (SH1), and 252 (SH2) are shown. The solutions for FIG. 2B result from inputs of shear mode, OD of 5.5 inches, thickness of 0.304 inches, cement density 1920 kg/m³, cement shear velocity of 1600 m/s and cement compressional velocity of 3000 m/s.

Figure 3:
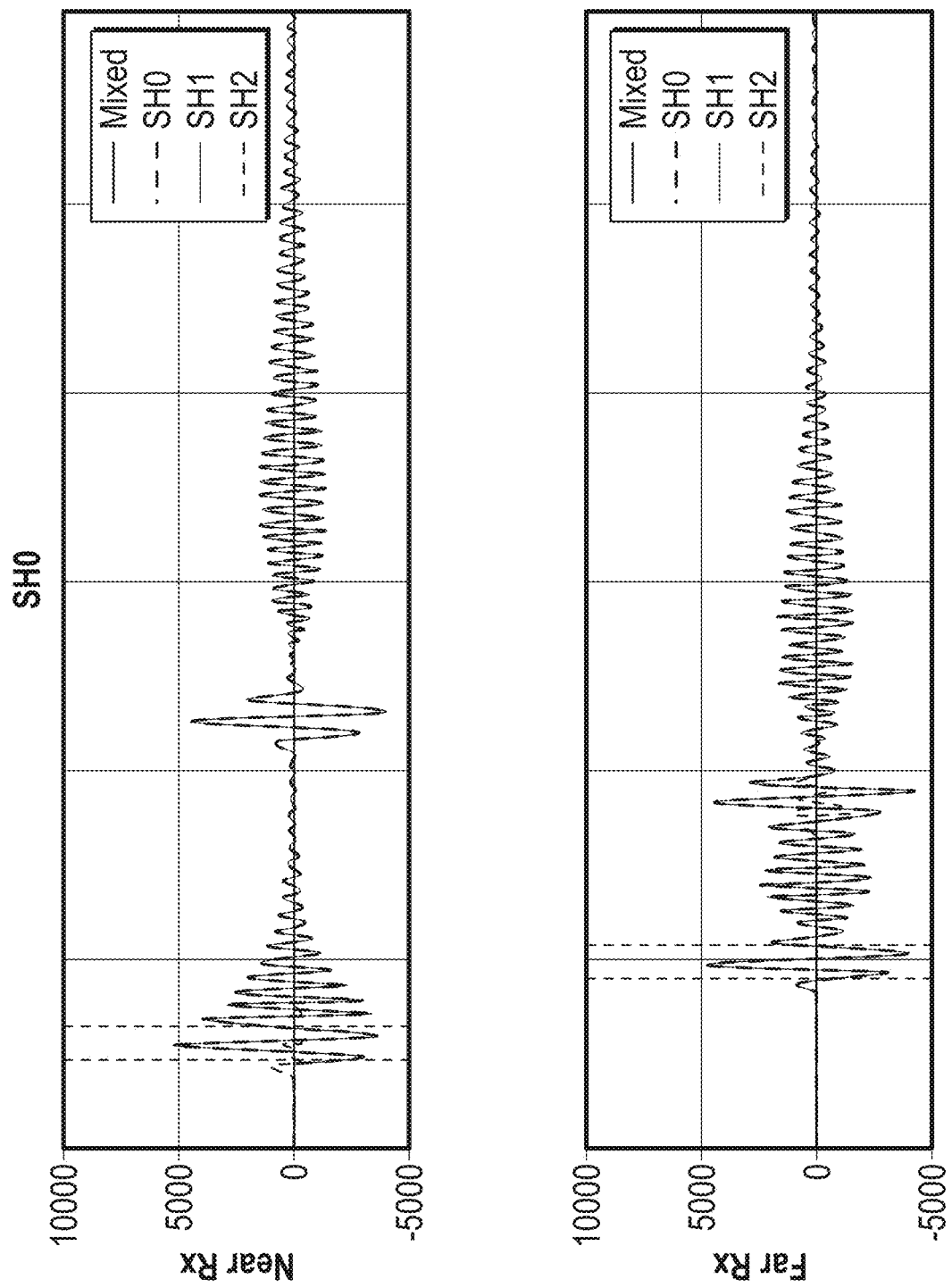
Figure 5:
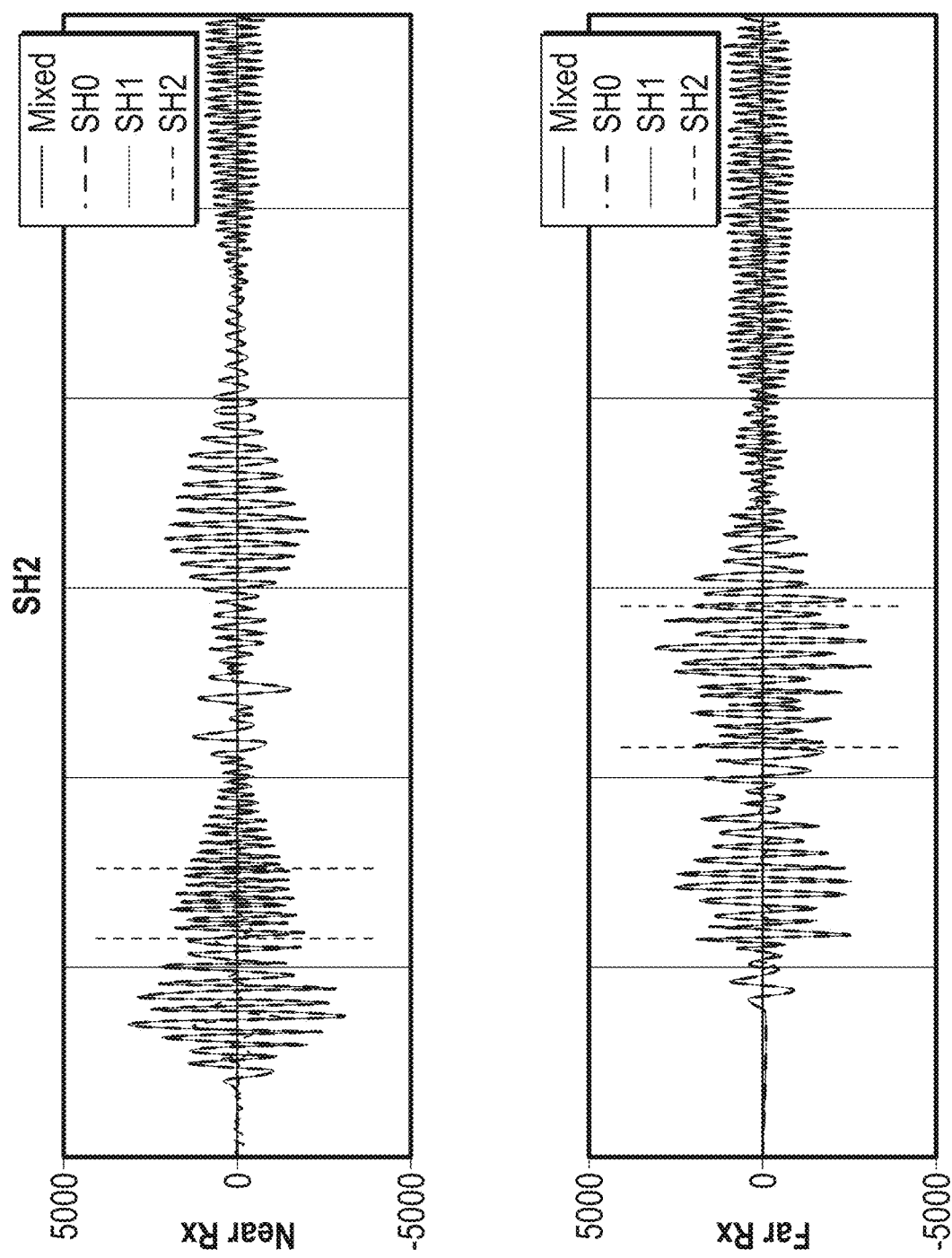
Figure 6:
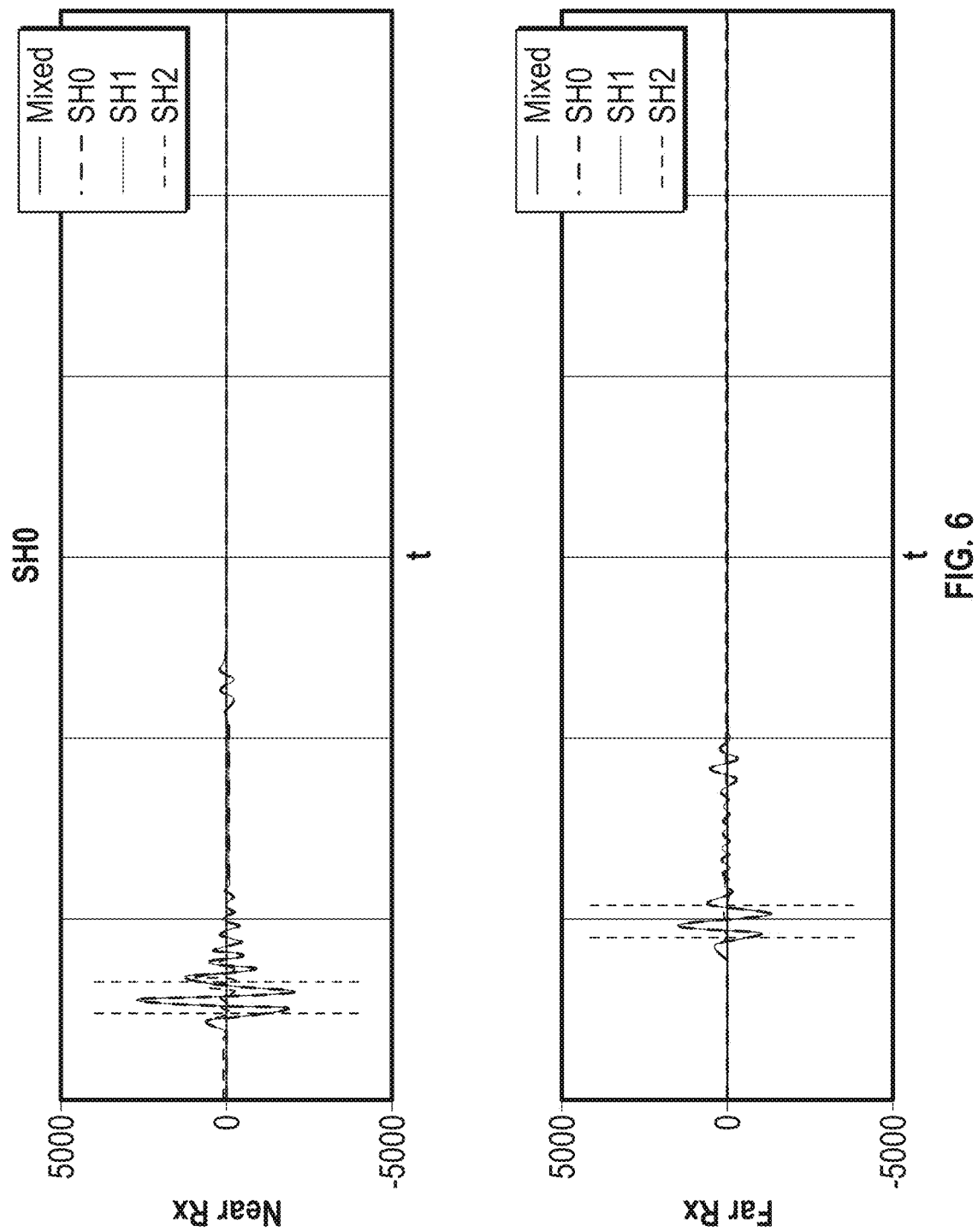
FIGS. 6-8 show curves representing the corresponding cemented casing waveforms.
Figure 7:
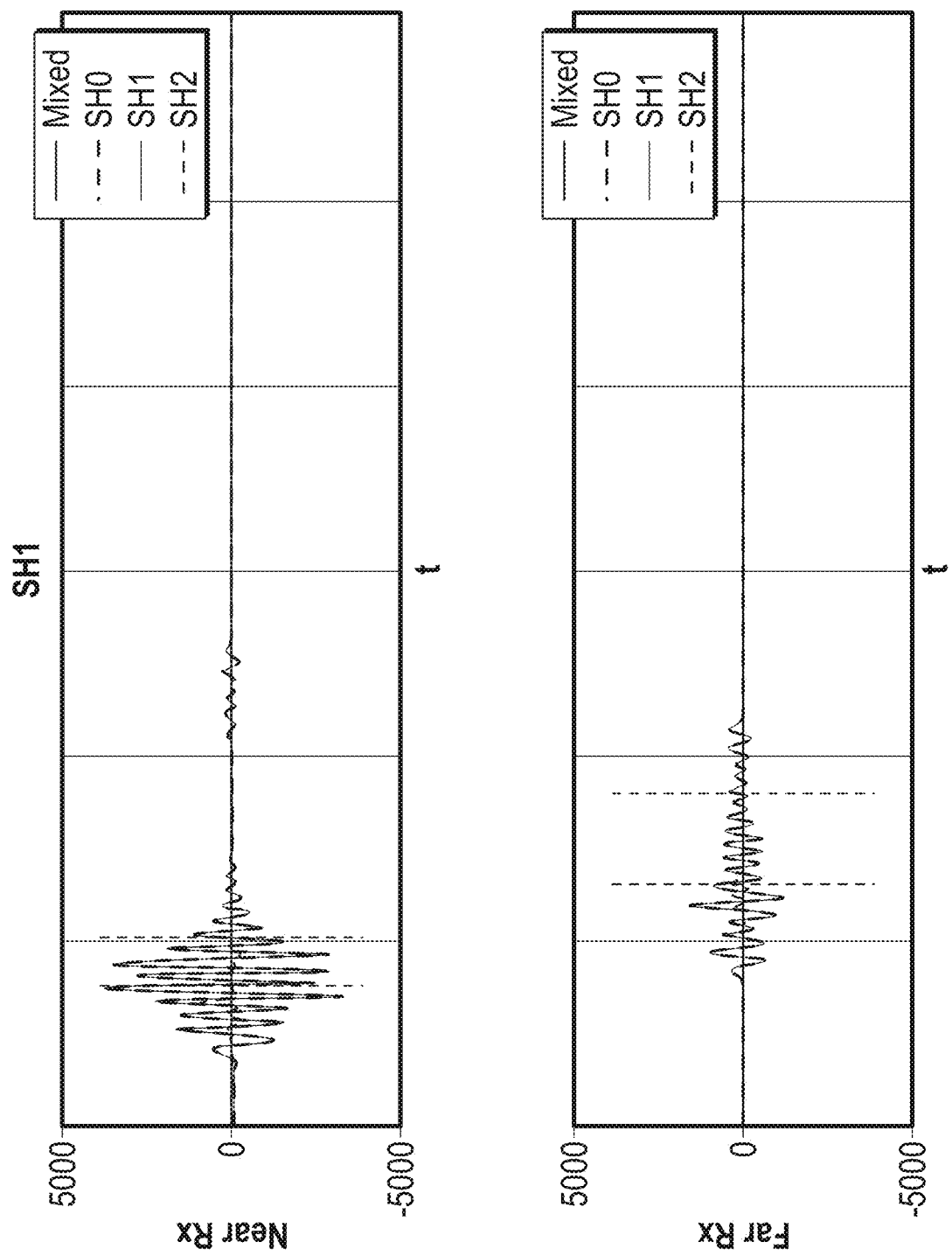
Figure 8:
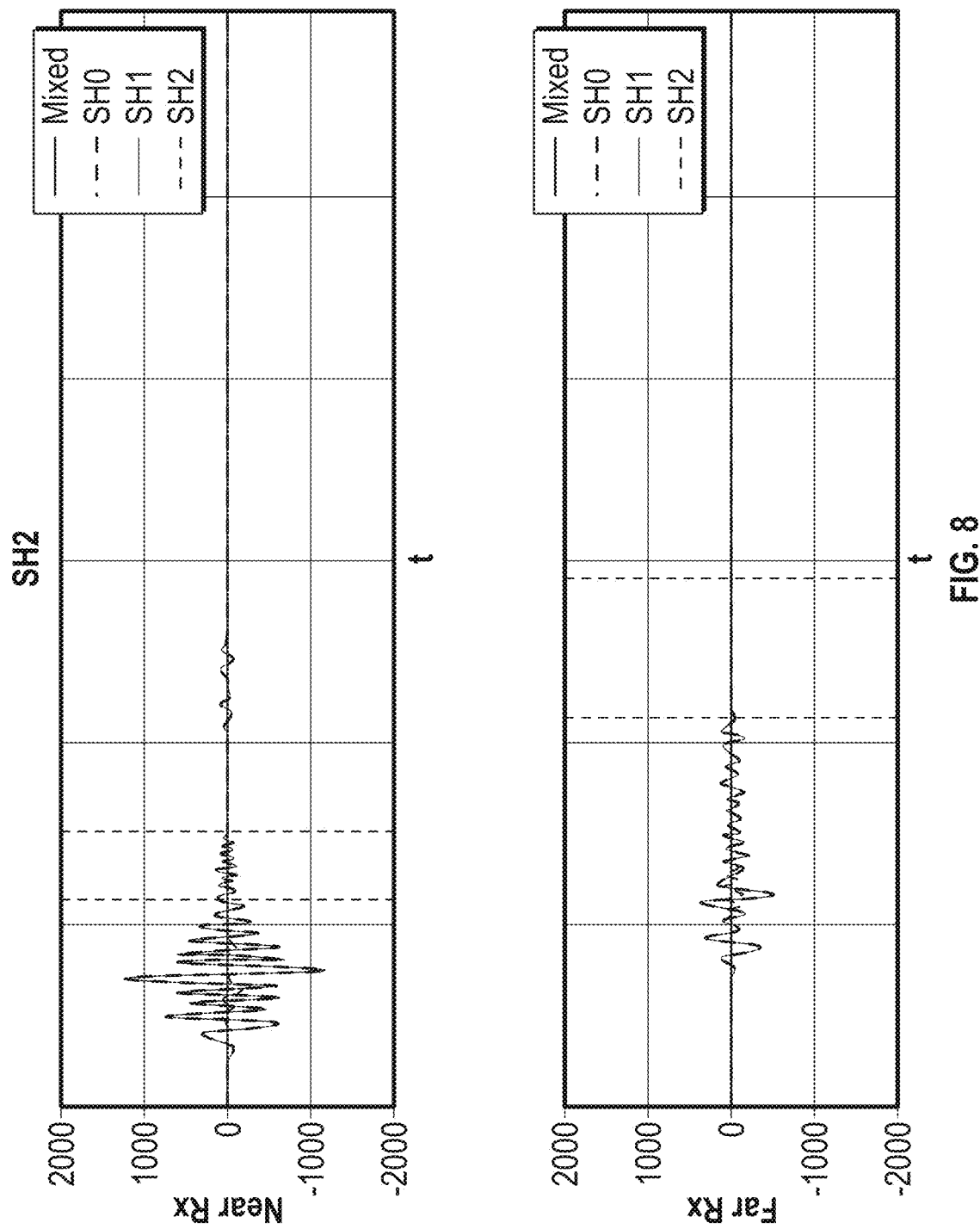
Figure 9:
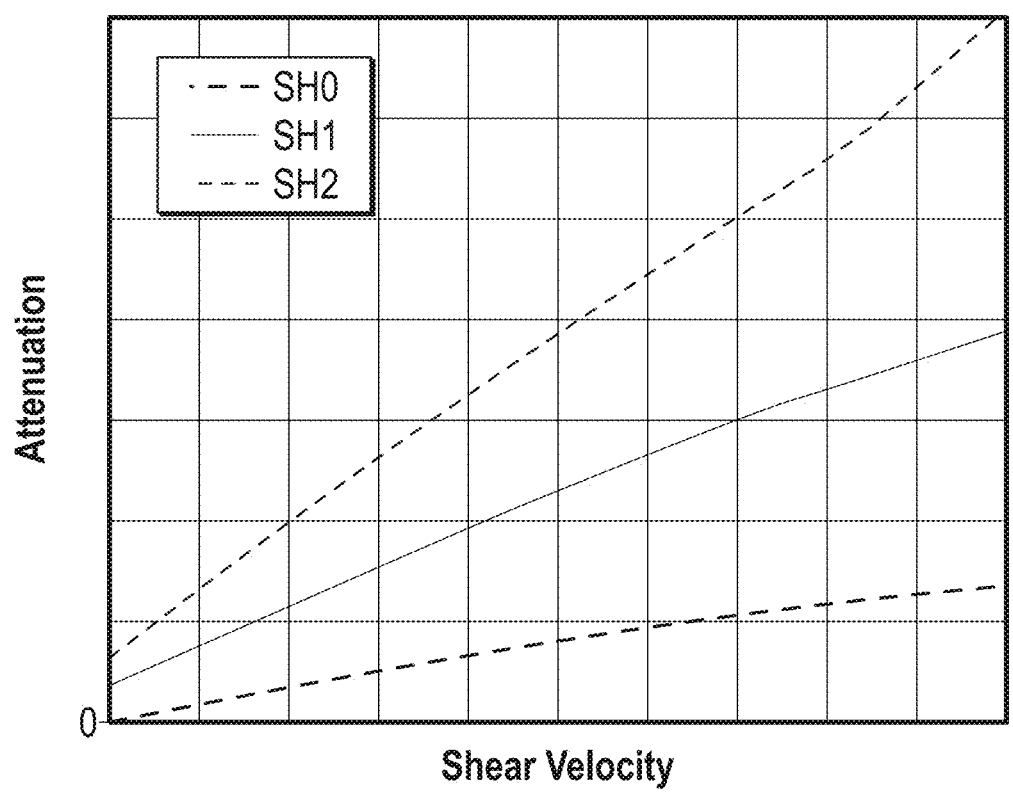
FIG. 9 shows automatically generated attenuation response curves for these three excitations.

FIG. 1A schematically illustrates an acoustic wellbore logging system 100 having a downhole tool 10 configured to acquire acoustic measurement information. FIG. 1B illustrates an acoustic logging tool in accordance with embodiments of the present disclosure. FIGS. 2A & 2B illustrate the excitation optimizer. FIGS. 3-5 illustrate corresponding free casing waveforms for SH0, SH1, and SH2, respectively. FIGS. 6-8 show curves representing the corresponding cemented casing waveforms. FIG. 9 shows automatically generated attenuation response curves for these three excitations. If the Sigdecay is greater than a threshold value, such as, for example 75 dB/ft, the selection may be indicated as a dangerous selection.

Aspects of the present disclosure are subject to application in various different embodiments. In some general embodiments, carrier 15 may be implemented as a tool string of a drilling system, and measurements taken in the borehole may be characterized as "logging-while-drilling" (LWD) or "measurement-while-drilling" (MWD) operations. An application that is especially suitable for techniques described above is the inspection and evaluation of downhole tubular, such as, for example, to detect corrosion, damage or other defects, particularly including casing integrity inspection.

As described herein, "borehole" or "wellbore" refers to a single hole that makes up all or part of a drilled well. Depending on the configuration, the system 701 may be used during drilling and/or after the wellbore 712 has been formed, including, in some instances after the installation of casing or production infrastructure. While a land system is shown, the teachings of the present disclosure may also be utilized in offshore or subsea applications. As described herein, "formations" refer to the various features and materials that may be encountered in a subsurface environment and surround the borehole. The term "information" includes, but is not limited to, raw data, processed data, and signals.

Mathematical models, look-up tables, or other models representing relationships between the signals and the values of the formation properties may be used to characterize operations in the formation or the formation itself, optimize one or more operational parameters of a production or development, and so on. The system may carry out these actions through notifications, advice, and/or intelligent control.

Modeled waveforms may be validated with tool waveforms. Modeled attenuation-velocity responses may be calculated directly from reconstructed waveforms and validated with experimental measurements. The response at a number of offset receivers may be used, such as, for example, a near and a far receiver. Data points (measurements) from in-situ cement test results are in good agreement with attenuation response curves derived through modeling.

Figure 10:
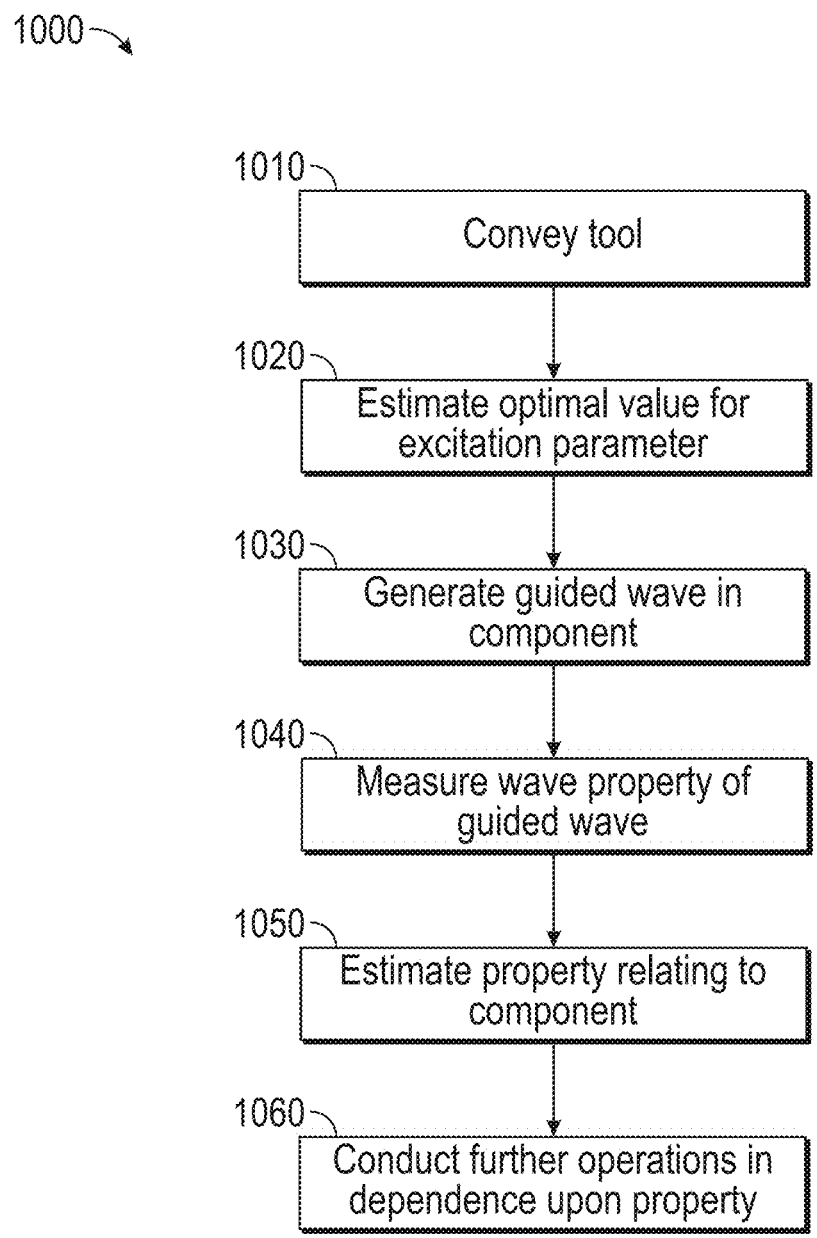
FIG. 10 shows a flow chart illustrating methods for performing well logging in a borehole intersecting an earth formation in accordance with embodiments of the present disclosure.

FIG. 10 shows a flow chart 1000 illustrating methods for inspecting an oilfield infrastructure component in accordance with embodiments of the present disclosure. In optional step 1010, wherein the method is related to performing well logging in a borehole intersecting an earth formation, an acoustic well logging tool is conveyed in a borehole using a carrier. In other embodiments, the tool may be conveyed in production tubing, or may be employed with non-tubular flow ways (e.g., rectangular ducts, plate, etc.).

Step 1020 comprises estimating an optimal value for at least one excitation parameter for an acoustic excitation source to produce a guided wave of mixed multiple modes in the component. The at least one excitation parameter may include at least frequency. Estimating the optimal value may be carried out by calculating a guided wave dispersion relation in a frequency domain for each of a plurality of simulated guided waves corresponding to a plurality of frequency values; modeling each of the plurality of simulated guided waves, wherein the modeling comprises generating a time domain waveform for each of a plurality of wave modes in dependence upon the acoustic excitation source; and using an excitation optimizer module for selecting the at least one excitation parameter corresponding to an optimal simulated guided wave determined in dependence upon the application of waveform criteria to the time domain waveforms. The simulated guided waves may correspond to a plurality of test values of the at least one excitation parameter.

Step 1030 comprises generating a guided wave in the component, such as, for example, tubular (e.g., casing) using the at least one optimal excitation parameter. Step 1040 comprises measuring at least one wave property of the guided wave in the component with the logging tool, such as, for example, wave speed, group velocity of different modes, and so on. Optional step 1050, specific to installed casing, comprises estimating a parameter of interest (e.g., a property) relating to installation of the casing using the at least one wave property. The property may include one of i) a shear modulus of the cement; ii) a Young's modulus of the cement; iii) compressive stress; iv) thickness; and v) cement density. Step 1060 comprises conducting further operations in the formation in dependence upon the property.

A forward model response may be established for the applicable casing survey tool used to acquire the measurements, such as, for example, based on an ideal structure previously defined from a prior infrastructure knowledge. An inversion may be performed with the forward model response to establish borehole and casing geometry, thickness, and corrosion variations, cement density, and so on. Cement density calibration may be carried out by iterative solutions (e.g., waveform matching) inverting for enhanced cement properties such as cement density.

Optional steps may include modeling an attenuation-velocity response for each of the plurality of simulated guided waves, summing the estimated time domain waveforms to model each guided wave, and/or estimating a processing window for calculating acoustic wave information from characteristics of a time domain waveform for at least one of the plurality of wave modes. For example, attenuation may be modeled from a window amplitude ratio of the time domain waveform for at least two of the plurality of wave modes. Other characteristics may include velocity, arrival time, and other wave packet characteristics.

Some implementations include generating at least one first excitation parameter for free casing, at least one second excitation parameter for fully cemented casing, and at least one third excitation parameter for partially cemented casing. The at least one excitation parameter may include at least one of: i) frequency; ii) number of firing cycles; iii) pulse shape; iv) firing length; v) number of unique frequencies; and vi) amplitude.

Optional methods may include using the parameter of interest to estimate a characteristic of a formation. Estimation of the parameter may include the use of a model. In some embodiments, the model may include, but is not limited to, one or more of: (i) a mathematical equation, (ii) an algorithm, (iii) an deconvolution technique, and so on. Reference information accessible to the processor may also be used.

Method embodiments may include conducting further operations in the earth formation in dependence upon formation information, estimated properties of the reflector(s), or upon models created using ones of these. Further operations may include at least one of: i) geosteering; ii) drilling additional boreholes in the formation; iii) performing additional measurements on the casing and/or the formation; iv) estimating additional parameters of the casing and/or the formation; v) installing equipment in the borehole; vi) evaluating the formation; vii) optimizing present or future development in the formation or in a similar formation; viii) optimizing present or future exploration in the formation or in a similar formation; ix) drilling the borehole; and x) producing one or more hydrocarbons from the formation.

Estimated parameters of interest may be stored (recorded) as information or visually depicted on a display. The parameters of interest may be transmitted before or after storage or display. For example, information may be transmitted to other downhole components or to the surface for storage, display, or further processing. Aspects of the present disclosure relate to modeling a volume of an earth formation using the estimated parameter of interest, such as, for example, by associating estimated parameter values with portions of the volume of interest to which they correspond, or by representing the boundary and the formation in a global coordinate system. The model of the earth formation generated and maintained in aspects of the disclosure may be implemented as a representation of the earth formation stored as information. The information (e.g., data) may also be transmitted, stored on a non-transitory machine-readable medium, and/or rendered (e.g., visually depicted) on a display.

The processing of the measurements by a processor may occur at the tool, the surface, or at a remote location. The data acquisition may be controlled at least in part by the electronics. Implicit in the control and processing of the data is the use of a computer program on a suitable non-transitory machine readable medium that enables the processors to perform the control and processing. The non-transitory machine readable medium may include ROMs, EPROMs, EEPROMs, flash memories and optical disks. The term processor is intended to include devices such as a field programmable gate array (FPGA).

The term "conveyance device" as used above means any device, device component, combination of devices, media and/or member that may be used to convey, house, support or otherwise facilitate the use of another device, device component, combination of devices, media and/or member. Exemplary non-limiting conveyance devices include drill strings of the coiled tube type, of the jointed pipe type and any combination or portion thereof. Other conveyance device examples include casing pipes, wirelines, wire line sondes, slickline sondes, drop shots, downhole subs, BHA's, drill string inserts, modules, internal housings and substrate portions thereof, self-propelled tractors. As used above, the term "sub" refers to any structure that is configured to partially enclose, completely enclose, house, or support a device. The term "information" as used above includes any form of information (Analog, digital, EM, printed, etc.). The term "processor" or "information processing device" herein includes, but is not limited to, any device that transmits, receives, manipulates, converts, calculates, modulates, transposes, carries, stores or otherwise utilizes information. An information processing device may include a microprocessor, resident memory, and peripherals for executing programmed instructions. The processor may execute instructions stored in computer memory accessible to the processor, or may employ logic implemented as field-programmable gate arrays ('FPGAs'), application-specific integrated circuits ('ASICs'), other combinatorial or sequential logic hardware, and so on. Thus, a processor may be configured to perform one or more methods as described herein, and configuration of the processor may include operative connection with resident memory and peripherals for executing programmed instructions.

In some embodiments, estimation of the parameter of interest may involve applying a model. The model may include, but is not limited to, (i) a mathematical equation, (ii) an algorithm, (iii) a database of associated parameters, or a combination thereof.

Control of components of apparatus and systems described herein may be carried out using one or more models as described above. For example, at least one processor may be configured to modify operations i) autonomously upon triggering conditions, ii) in response to operator commands, or iii) combinations of these. Such modifications may include changing drilling parameters, steering the drillbit (e.g., geosteering), changing a mud program, optimizing measurements, and so on. Control of these devices, and of the various processes of the drilling system generally, may be carried out in a completely automated fashion or through interaction with personnel via notifications, graphical representations, user interfaces and the like. Reference information accessible to the processor may also be used.

The processing of the measurements made in wireline or MWD applications may be done by a surface processor, by a downhole processor, or at a remote location. The data acquisition may be controlled at least in part by the downhole electronics. Implicit in the control and processing of the data is the use of a computer program on a suitable non-transitory machine readable medium that enables the processors to perform the control and processing. The non-transitory machine readable medium may include ROMs, EPROMs, EEPROMs, flash memories and optical disks. The term processor is intended to include devices such as a field programmable gate array (FPGA).

While the foregoing disclosure is directed to the one mode embodiments of the disclosure, various modifications will be apparent to those skilled in the art. It is intended that all variations be embraced by the foregoing disclosure.

What is claimed is:

1. A method of inspecting an installed oilfield infrastructure component, the method comprising:
    estimating an optimal value for each of a plurality of excitation parameters for an acoustic excitation source to produce a guided wave of mixed multiple modes in the component by modeling a plurality of simulated guided waves generated from a plurality of parameter values for each of the plurality of excitation parameters, wherein each simulated guided wave of the plurality corresponds to a combination of parameter values including at least one parameter value of the plurality for each of the plurality of excitation parameters, comprising:
        calculating a guided wave dispersion relation in a frequency domain for simulated guided waves of the plurality corresponding to a plurality of frequency values;
        modeling each of the plurality of simulated guided waves, wherein the modeling comprises generating a time domain waveform for each of a plurality of wave modes in dependence upon the acoustic excitation source;
        generating at least one excitation map by calculating an excitation score for each time domain waveform determined in dependence upon the application of waveform criteria; and
        selecting the optimal value for each of the plurality of excitation parameters corresponding to an optimal simulated guided wave determined in dependence upon the at least one excitation map;
    generating a guided wave in the component using the optimal value for each of the plurality of excitation parameters.

2. The method of claim 1 comprising modeling an attenuation-velocity response for each of the plurality of simulated guided waves.

3. The method of claim 1 comprising summing the generated time domain waveform for each of the plurality of wave modes to model each simulated guided wave.

4. The method of claim 1 comprising estimating a processing window for calculating acoustic wave information from characteristics of a time domain waveform for at least one of the plurality of wave modes.

5. The method of claim 1 comprising generating at least one first excitation parameter for free casing, at least one second excitation parameter for fully cemented casing, and at least one third excitation parameter for partially cemented casing.

6. The method of claim 1 wherein the the plurality of excitation parameters comprise at least one of: i) pulse shape;
    ii) firing length; iii) number of unique frequencies; iv) amplitude.

7. The method of claim 1 wherein the component comprises tubular installed downhole.

8. The method of claim 7 further comprising:
    measuring at least one wave property of the guided wave in the tubular with a logging tool; and
    estimating a property relating to installation of the tubular using the at least one wave property.

9. The method of claim 7 wherein the tubular comprises casing installed in the borehole using cement.

10. The method of claim 9 wherein the property comprises at least one of: i) compressive stress; ii) thickness.

11. The method of claim 8 comprising conducting further operations in the formation in dependence upon the property.

12. The method of claim 11 wherein the further operations comprise at least one of:
    i) geosteering; ii) drilling additional boreholes in the formation; iii) performing additional measurements on the formation; iv) estimating additional parameters of the formation; v) installing equipment in the borehole; vi) evaluating the formation; vii) optimizing present or future development in the formation or in a similar formation; viii) optimizing present or future exploration in the formation or in a similar formation; ix) installing equipment in the borehole; x) producing one or more hydrocarbons from the formation; xi) repairing the component; xii) replacing the component.

13. The method of claim 8 wherein the property comprises a characteristic of a structural feature relating to the at least one tubular.

14. The method of claim 13 wherein the structural feature comprises at least one of:
    i) tubular ovality of the at least one tubular; ii) deformation of the at least one tubular; iii) corrosion of the at least one tubular, iv) perforation of the at least one tubular, v) a presence of a completion component outside of the at least one tubular, vi) eccentricity of the at least one tubular with respect to another component, vii) a material property of the at least one tubular; viii) a material property of a material surrounding the at least one tubular.

15. The method of claim 1 wherein the guided wave is a circumferential guided wave.

16. A method of well logging, the method comprising:
    estimating an optimal value for each of a plurality of excitation parameters for an acoustic excitation source to produce a guided wave of mixed multiple modes downhole by modeling a plurality of simulated guided waves generated from a plurality of parameter values for each of the plurality of excitation parameters, wherein each simulated guided wave of the plurality corresponds to a combination of parameter values including at least one parameter value of the plurality for each of the plurality of excitation parameters, comprising:

calculating a guided wave dispersion relation in a frequency domain for simulated guided waves of the plurality corresponding to a plurality of frequency values;

modeling each of the plurality of simulated guided waves, wherein the modeling comprises generating a time domain waveform for each of a plurality of wave modes in dependence upon the acoustic excitation source;

generating at least one excitation map by calculating an excitation score for each time domain waveform determined in dependence upon the application of waveform criteria; and selecting the optimal value for each of the plurality of excitation parameters corresponding to an optimal simulated guided wave determined in dependence upon the at least one excitation map;

generating a guided wave downhole using the optimal value for each of the plurality of excitation parameters.

* * * * *